(12) United States Patent
Park et al.

(10) Patent No.: US 12,630,470 B2
(45) Date of Patent: May 19, 2026

(54) POLYAMIDEIMIDE FILM AND WINDOW COVER FILM INCLUDING THE SAME

(71) Applicants: SK Innovation Co., Ltd., Seoul (KR); SK ie technology Co., Ltd., Seoul (KR)

(72) Inventors: Jin Hyung Park, Daejeon (KR); Sang Yoon Park, Daejeon (KR); Hyeon Jeong Kim, Daejeon (KR); Hye Ri Kim, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 684 days.

(21) Appl. No.: 17/517,038

(22) Filed: Nov. 2, 2021

(65) Prior Publication Data

US 2022/0135470 A1 May 5, 2022

(30) Foreign Application Priority Data

Nov. 3, 2020 (KR) ........................ 10-2020-0145125

(51) Int. Cl.
| | |
|---|---|
| *C03C 17/32* | (2006.01) |
| *C08G 73/14* | (2006.01) |
| *C08J 5/18* | (2006.01) |
| *G09F 9/30* | (2006.01) |

(52) U.S. Cl.
CPC .............. *C03C 17/32* (2013.01); *C08G 73/14* (2013.01); *C08J 5/18* (2013.01); *G09F 9/301* (2013.01); *C08J 2379/08* (2013.01)

(58) Field of Classification Search
CPC .... C03C 17/32; C08G 73/14; C08G 73/1007; C08G 73/1039; C08G 73/1042; C08G 73/1067; C08G 73/1085; C08J 5/18; C08J 7/04; G09F 9/301; G06F 3/041
See application file for complete search history.

(56) References Cited

U.S. PATENT DOCUMENTS

| 2015/0011726 A1 | 1/2015 | Hasegawa et al. |
|---|---|---|
| 2015/0148517 A1 | 5/2015 | Androsov et al. |
| 2016/0319076 A1 | 11/2016 | Ju et al. |
| 2017/0342224 A1* | 11/2017 | Chae ..................... G06F 1/1652 |
| 2018/0044476 A1 | 2/2018 | Park et al. |
| 2019/0352463 A1* | 11/2019 | Maitani .............. C08G 73/1007 |
| 2020/0040152 A1 | 2/2020 | Yun et al. |
| 2020/0103694 A1 | 4/2020 | Daimatsu et al. |
| 2024/0043619 A1 | 2/2024 | Kanada et al. |

FOREIGN PATENT DOCUMENTS

| CN | 106977718 | A | 7/2017 |
|---|---|---|---|
| JP | 2002161136 | A | 6/2002 |
| JP | 2015214597 | A | 12/2015 |
| JP | 2016204569 | A | 12/2016 |
| JP | 2018053156 | A | 4/2018 |
| JP | 20207531 | A | 1/2020 |
| KR | 1020140129155 | A | 11/2014 |
| KR | 1020150065967 | A | 6/2015 |
| KR | 1020150104282 | A | 9/2015 |
| KR | 20170043885 | A | 4/2017 |
| KR | 20170051358 | A | 5/2017 |
| KR | 1020170102535 | A | 9/2017 |
| KR | 101796875 | B1 | 11/2017 |
| KR | 1020180018307 | A | 2/2018 |
| KR | 1020180128828 | A | 12/2018 |
| KR | 1020190087397 | A | 7/2019 |
| KR | 20200001994 | A | 1/2020 |
| TW | 1508999 | B | 11/2015 |
| WO | 2015099478 | A1 | 7/2015 |
| WO | 2016088641 | A1 | 6/2016 |
| WO | 2018097143 | A1 | 5/2018 |
| WO | 2022071443 | A1 | 4/2022 |

OTHER PUBLICATIONS

Kanada et al., machine English translation of KR 10-2020-0001994 (Year: 2020).*
Choi et al., machine English translation of CN 106977718 (Year: 2017).*

* cited by examiner

*Primary Examiner* — Jessica M Roswell
(74) *Attorney, Agent, or Firm* — The Webb Law Firm

(57) ABSTRACT

Provided is a polyamideimide film and a window cover film including the same. More particularly, a polyamideimide film which may provide physical properties satisfying both modulus and retardation in a thickness direction which are in a trade-off relationship with each other, and thus, has a less screen distortion phenomenon when it is applied to a window cover film and excellent optical properties, and a window cover film including the same are provided.

9 Claims, No Drawings

POLYAMIDEIMIDE FILM AND WINDOW COVER FILM INCLUDING THE SAME

CROSS-REFERENCE TO RELATED APPLICATION

This application claims priority to Korean Patent Application No. 10-2020-0145125 filed Nov. 3, 2020, the disclosure of which is hereby incorporated by reference in its entirety.

BACKGROUND OF THE INVENTION

Field of the Invention

The following disclosure relates to a polyamideimide film and a window cover film including the same. More particularly, the following disclosure relates to a polyamideimide film which may provide physical properties satisfying both modulus and retardation in a thickness direction which are in a trade-off relationship with each other, and thus, has a less screen distortion when it is applied to a window cover film and excellent optical properties, and a window cover film including the same.

Description of Related Art

A thin display is implemented in the form of a touch screen panel and is used in various smart devices including smart phones, tablet PCs, and various wearable devices.

Display devices using the touch screen panel are provided with a window cover including tempered glass or a plastic film on a display panel for protecting the display panel from scratches or external shock.

Since the window cover is a configuration formed in the outermost part of a display device, thermal resistance, mechanical properties, and optical properties should be satisfied, and, in particular, it is important that display quality is high and light distortion such as a Mura phenomenon and image distortion does not occur (Korean Patent Laid-Open Publication No. 10-2015-0104282 (Sep. 15, 2015)).

As a polymer material applied to the window cover film, a polyimide-based resin and the like are used, and in order to apply the polymer to a foldable display and the like, improvement of mechanical properties is required, but when a monomer having a rigid structure is used in a large amount for improving mechanical properties, the mechanical properties of a polymer may be improved, but optical properties are deteriorated, for example, a yellow index is increased, or retardation in a thickness direction is increased. That is, rigidity in a polymer molecule and concentration of an intermolecular laminated structure occur to greatly increase retardation in a thickness direction ($R_{th}$). When the retardation in a thickness direction ($R_{th}$) is greatly increased, it means that a retardation value is non-uniform in an omni-directional viewing angle, and when it is applied to a window cover film, image distortion phenomenon may be severe.

Therefore, as a substitute for tempered glass or conventional organic materials, development of a window cover which may solve a light distortion problem while retaining mechanical physical properties, thermal properties, and various optical properties, is still needed.

SUMMARY OF THE INVENTION

When a polymer is prepared by adding a monomer having a rigid structure for improving the mechanical properties of a conventional polyamideimide resin, mechanical properties such as modulus are improved, but retardation in a thickness direction which is in a trade-off relationship with the mechanical properties is increased, thereby causing distortion on a screen when the polymer is applied to a window cover film.

An embodiment of the present invention is directed to providing a polyamideimide film having both excellent mechanical properties and low retardation in a thickness direction, for lessening the problem.

Another embodiment of the present invention is directed to providing a polyamideimide film which may show high light transmittance in a visible light radio wave area, have a low haze, and implement low yellow index properties simultaneously.

Still another embodiment of the present invention is directed to providing a window cover film which replaces tempered glass and the like, and a new window cover film which may satisfy excellent mechanical properties and thermal properties and various optical properties, and also, may solve a light distortion problem.

As a result of research to achieve the above objects, it was found that when a film is prepared using polyamideimide polymerized by including a compound having a specific structure, a polyamideimide film having both excellent mechanical properties and low retardation in a thickness direction may be provided, thereby completing the present invention.

In one general aspect, a polyamideimide film includes a unit derived from an aromatic diamine, an aromatic dianhydride, and aromatic diacid dichloride, wherein the aromatic dianhydride includes 9,9-bis(3,4-dicarboxyphenyl)fluorene dianhydride, and the polyamideimide film has a modulus of 5 GPa or more and a retardation in a thickness direction ($R_{th}$) of 5000 nm or less as measured at 550 nm.

In an exemplary embodiment of the present invention, the polyamideimide film may have a total light transmittance of 87% or more as measured at 400 to 700 nm in accordance with ASTM 1003, a haze in accordance with ASTM D1003 of 2.0% or less, and a yellow index in accordance with ASTM E313 of 5 or less.

In an exemplary embodiment of the present invention, the aromatic diamine may include 2,2'-bis(trifluoromethyl)-benzidine.

In an exemplary embodiment of the present invention, the polyamideimide film may further include a unit derived from a cycloaliphatic dianhydride.

In an exemplary embodiment of the present invention, the aromatic dianhydride may further include 4,4'-hexafluoroisopropylidene diphthalic anhydride (6FDA).

In an exemplary embodiment of the present invention, the aromatic dianhydride may be used as a mixture of 9,9-bis(3,4-dicarboxyphenyl)fluorene dianhydride and 4,4'-hexafluoroisopropylidene diphthalic anhydride (6FDA) at a mole ratio of 1:1 to 5.

In an exemplary embodiment of the present invention, a content of the aromatic diacid dichloride may be 50 mol or more with respect to 100 mol of the aromatic diamine. Here, the aromatic diacid dichloride may include terephthaloyl dichloride (TPC).

In an exemplary embodiment of the present invention, the aromatic diacid dichloride may be terephthaloyl dichloride (TPC), and the contents of the terephthaloyl dichloride (TPC) and the 9,9-bis(3,4-dicarboxyphenyl)fluorene dianhydride (BPAF) may be 70 mol or more with respect to 100 mol of the diamine. Here, the content of the terephthaloyl dichloride (TPC) may be 50 mol or more with respect to 100 mol of the aromatic diamine.

In an exemplary embodiment of the present invention, the polyamideimide film may have a thickness of 1 to 500 μm.

In another general aspect, a window cover film includes the polyamideimide film according to the above exemplary embodiment.

In an exemplary embodiment of the present invention, any one or more coating layers selected from a hard coating layer, an antistatic layer, an anti-fingerprint layer, an anti-fouling layer, an anti-scratch layer, a low-refractive layer, an anti-reflective layer, and a shock absorption layer may be on at least one surface of the polyamideimide film.

In still another general aspect, a flexible display panel includes the polyamideimide film according to the above exemplary embodiment.

DESCRIPTION OF THE INVENTION

Hereinafter, a polyamideimide film of the present invention and a window cover film including the same will be described in detail. However, this is not intended to limit the protection scope defined in the claims.

In addition, the technical and scientific terms used in the description of the invention have, unless otherwise defined, the meaning commonly understood by those of ordinary skill in the art.

Throughout the present specification describing the present invention, unless explicitly described to the contrary, "comprising" any elements will be understood to imply further inclusion of other elements rather than the exclusion of any other elements.

In the case of a conventional polyamide film or polyamideimide film, when a polymer polymerized using a compound having a rigid structure is produced into a film for increasing mechanical properties, the mechanical properties are increased, but retardation in a thickness direction $(R_{th})$ is greatly increased to more than 5000 nm, which causes occurrence of distortion when the film is applied to a display and the like.

The inventors of the present invention conducted studies for lessening the problem, and as a result, confirmed that by including a compound having a specific structure as an aromatic dianhydride, the problem may be solved.

That is, an embodiment of the present invention relates to a polyamideimide film which satisfies both physical properties of a modulus of 5 GPa or more and a retardation in a thickness direction $(R_{th})$ of 5000 nm or less as measured at 550 nm, wherein the polyamideimide film includes a unit derived from an aromatic diamine, an aromatic dianhydride, and an aromatic diacid dichloride, and the aromatic dianhydride includes 9,9-bis(3,4-dicarboxyphenyl)fluorene dianhydride.

In an addition, if necessary, the polyamideimide film may further include a unit derived from a cycloaliphatic dianhydride.

More specifically, the present invention may have a modulus of 5 GPa or more, 6 GPa or more, and specifically 5 to 10 GPa, and a retardation in a thickness direction $(R_{th})$ of 5000 nm or less, 4500 nm or less, and specifically 2000 to 5000 nm as measured at 550 nm.

In addition, in order for the film to satisfy the modulus and the retardation in a thickness direction $(R_{th})$ and also to be applied to a window cover film, the film satisfies the physical properties of a total light transmittance of 87% or more, 88% or more, or 89% or more as measured at 400 to 700 nm in accordance with ASTM D1003, a haze in accordance with ASTM D1003 of 2.0% or less, 1.5% or less, or 1.0% or less, and a yellow index in accordance with ASTM E313 of 5 or less, 4 or less, or 3 or less.

More specifically, the polyamideimide film according to an exemplary embodiment of the present invention for satisfying all of the physical properties may be exemplified as follows, but is not limited thereto.

An exemplary embodiment of the present invention may be a polyamideimide film including a unit derived from an aromatic diamine, an aromatic dianhydride, and aromatic diacid dichloride. In this case, 5 to 50 mol of the aromatic dianhydride and 50 to 80 mol of the aromatic diacid dichloride may be included in 100 mol of the aromatic diamine. The content range is an example for satisfying the modulus and the retardation in a thickness direction, and may be adjusted by a monomer composition, but is not limited thereto.

Another exemplary embodiment of the present invention may be a polyamideimide film including a unit derived from an aromatic diamine, an aromatic dianhydride, a cycloaliphatic dianhydride, and an aromatic diacid dichloride. In this case, 5 to 50 mol of the aromatic dichloride, 5 to 30 mol of the cycloaliphatic dianhydride, and 50 to 80 mol of the aromatic diacid dichloride may be included with respect to 100 mol of the aromatic diamine. The content range is an example for satisfying the modulus and the retardation in a thickness direction to be desired and may be changed by the composition of a monomer, but is not limited thereto.

Each component used in an exemplary embodiment of the present invention will be described in more detail.

The aromatic diamine may be used without limitation as long as it is commonly used in the art. For example, a fluorine-based aromatic diamine to which a fluorine substituent is introduced may be used. In addition, it may be used with an aromatic dianhydride, in particular, 9,9-bis(3, 4-dicarboxyphenyl)fluorene dianhydride (BPAF). The film including the aromatic diamine or the aromatic dianhydride according to an exemplary embodiment of the present invention may have high total light transmittance, low haze, and low retardation in a thickness direction.

The fluorine-based aromatic diamine component may be used as a mixture with 2,2'-bis(trifluoromethyl)-benzidine (TFMB) and another known aromatic diamine component, or 2,2'-bis(trifluoromethyl)-benzidine may be used alone.

The aromatic dianhydride necessarily includes 9,9-bis(3, 4-dicarboxyphenyl)fluorene Dianhydride) (BPAF), thereby providing a film having low retardation in a thickness direction. More specifically, even in the case of increasing the content of a compound having a rigid structure for increasing the mechanical strength of a film, by using 9,9-bis(3,4-dicarboxyphenyl)fluorene dianhydride, retardation in a thickness direction is prevented from increasing simultaneously, and thus, a film having excellent mechanical strength and also low retardation in a thickness direction may be provided.

In addition, in addition to 9,9-bis(3,4-dicarboxyphenyl) fluorene dianhydride (BPAF), if necessary, at least one or a mixture of two or more of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidene-diphenoxy) bis(phthalic anhydride)(6HDBA), 4-(2,5-dioxo-tetrahydrofuran-3-yl)-1,2,3,4-tetrahydronaphthalene-1,2-di-carboxylicdianhydride (TDA), 1,2,4,5-benzene tetracarboxylic dianhydride (PMDA), benzophenone tetra-carboxylic dianhydride (BMA), bis(carboxylphenyl) dimethyl silane dianhydride (SiDA), and bis(dicarboxyphe-noxy) diphenyl sulfide dianhydride (BDSDA) may be further included, but the present invention is not limited thereto.

Specifically, 9,9-bis(3,4-dicarboxyphenyl)fluorene dian-hydride (BPAF) and 4,4'-hexafluoroisopropylidene diph-thalic anhydride (6FDA) may be mixed, and in this case, 9,9-bis(3,4-dicarboxyphenyl)fluorene dianhydride and 4,4'-hexafluoroisopropylidene diphthalic anhydride (6FDA) may be used at a mole ratio of 1:1 to 5 as a mixture.

As the cycloaliphatic dianhydride, for example, any one or a mixture of two or more selected from the group consisting of 1,2,3,4-cyclobutanetetracarboxylic dianhy-dride (CBDA), 5-(2,5-dioxotetrahydrofuryl)-3-methylcyclo-hexene-1,2-dicarboxylic dianhydride (DOCDA), bicyclo [2.2.2]oct-7-en-2,3,5,6-tetracarboxylic dianhydride (BTA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof may be used, but the present invention is not limited thereto.

Specifically, 1,2,3,4-cyclobutanetetracarboxylic dianhy-dride (CBDA) may be used.

As the aromatic diacid dichloride, a mixture of two or more selected from the group consisting of isophthaloyl dichloride (IPC), terephthaloyl dichloride (TPC), [1,1'-bi-phenyl]-4,4'-dicarbonyl dichloride (BPC), 1,4-naphthalene dicarboxylic dichloride (NPC), 2,6-naphthalene dicarbox-ylic dichloride (NTC), 1,5-naphthalene dicarboxylic dichlo-ride (NEC), and derivatives thereof may be used, but the present invention is not limited thereto.

When an amide structure in the polymer chain is formed by the aromatic diacid dichloride, not only the optical properties but also the mechanical strength including the modulus, in particular, may be greatly improved.

Otherwise, for example, in order to improve the mechani-cal properties of a film, more specifically, in order to satisfy the physical properties of a modulus in accordance with ASTM D882 of 5 GPa or more, the content of the aromatic diacid dichloride may be 50 mol or more, 55 mol or more, 60 mol or more, and more specifically 50 mol to 100 mol with respect to 100 mol of the aromatic diamine.

More specifically, the aromatic diacid dichloride may include terephthaloyl dichloride (TPC). When the content of terephthaloyl dichloride is 50 mol or more with respect to 100 mol of the aromatic diamine, mechanical properties such as modulus may be greatly increased. However, inter-molecular concentration may be increased to greatly increase retardation in a thickness direction, and when it is applied to a window cover film of a flexible display and the like, problems such as screen distortion may occur.

However, in an exemplary embodiment of the present invention, it was found that as described above, 9,9-bis(3, 4-dicarboxyphenyl)fluorene dianhydride (BPAF) having good rigidity and a bulky structure is used together to improve the phenomenon, and as desired, a film satisfying both physical properties of a modulus of 5 GPa or more and a retardation in a thickness direction ($R_{th}$) of 5000 nm or less as measured at 550 nm may be provided.

In addition, if necessary, isophthaloyl dichloride (IPC) and terephthaloyl dichloride (TPC) may be used in combi-nation.

In an exemplary embodiment of the present invention, a mixture equivalent ratio of the aromatic diamine to the cycloaliphatic dianhydride and the aromatic diacid dichloride may be 1:0.9 to 1.1, and more specifically close to 1:1. In an exemplary embodiment of the present invention, since film formation properties are included by molding a film from polyamideimide obtained by imidizing a polyamic acid resin derived from the monomer satisfying the range, the physical properties may be improved.

More specifically, a first embodiment of the present invention is a polyamideimide film including a unit derived from an aromatic diamine, an aromatic dianhydride, and aromatic diacid dichloride,
>    wherein the aromatic diamine includes 2,2'-bis(trifluo-romethyl)-benzidine,
>    the aromatic dianhydride includes 9,9-bis(3,4-dicarboxy-phenyl)fluorene dianhydride,
>    the aromatic diacid dichloride includes terephthaloyl dichloride (TPC), and
>    the polyamideimide film has a modulus of 5 GPa or more and a retardation in a thickness direction ($R_{th}$) of 5000 nm or less as measured at 550 nm.

Here, though not limited thereto, the content of tereph-thaloyl dichloride (TPC) may be 50 mol or more with respect to 100 mol of the aromatic diamine, and the content of the terephthaloyl dichloride (TPC) and the 9,9-bis(3,4-dicarboxyphenyl)fluorene dianhydride (BPAF) may be 70 mol or more with respect to 100 mol of the diamine. More specifically, the content of the 9,9-bis(3,4-dicarboxyphenyl) fluorene dianhydride (BPAF) may be 20 to 50 mol with respect to 100 mol of the diamine.

A second embodiment of the present invention is a polyamideimide film including a unit derived from an aro-matic diamine, an aromatic dianhydride, and aromatic diacid dichloride,
>    wherein the aromatic diamine includes 2,2'-bis(trifluo-romethyl)-benzidine,
>    the aromatic dianhydride includes 9,9-bis(3,4-dicarboxy-phenyl)fluorene dianhydride and 4,4'-hexafluoroiso-propylidene diphthalic anhydride (6FDA),
>    the aromatic diacid dichloride includes terephthaloyl dichloride (TPC), and
>    the polyamideimide film has a modulus of 5 GPa or more and a retardation in a thickness direction ($R_{th}$) of 5000 nm or less as measured at 550 nm.

Here, though not limited thereto, the content of tereph-thaloyl dichloride (TPC) may be 50 mol or more with respect to 100 mol of the aromatic diamine, and the content of the aromatic dianhydride and the aromatic diacid dichlo-ride may be 70 mol or more with respect to 100 mol of the diamine.

In addition, though not limited thereto, the 9,9-bis(3,4-dicarboxyphenyl)fluorene dianhydride and 4,4'-hexafluor-oisopropylidene diphthalic anhydride (6FDA) may be used at a mole ratio of 1:1 to 5 as a mixture.

A third embodiment of the present invention is a poly-amideimide film including a unit derived from an aromatic diamine, an aromatic dianhydride, a cycloaliphatic dianhy-dride, and an aromatic diacid dichloride,
>    wherein the aromatic diamine includes 2,2'-bis(trifluo-romethyl)-benzidine,
>    the aromatic dianhydride includes 9,9-bis(3,4-dicarboxy-phenyl)fluorene dianhydride,
>    the cycloaliphatic dianhydride includes 1,2,3,4-cyclobu-tanetetracarboxylic dianhydride (CBDA),
>    the aromatic diacid dichloride includes terephthaloyl dichloride (TPC), and
>    the polyamideimide film has a modulus of 5 GPa or more and a retardation in a thickness direction ($R_{th}$) of 5000 nm or less as measured at 550 nm.

Here, though not limited thereto, the content of the terephthaloyl dichloride (TPC) may be 50 mol or more with respect to 100 mol of the aromatic diamine, the content of the 1,2,3,4-cyclobutanetetracarboxylic dianhydride (CBDA) may be 10 mol to 25 mol with respect to 100 mol of the aromatic diamine, and the content of the 9,9-bis(3,4-dicarboxyphenyl)fluorene dianhydride (BPAF) may be 10 mol to 25 mol with respect to 100 mol of the aromatic diamine.

A fourth embodiment of the present invention is a polyamideimide film including a unit derived from an aromatic diamine, an aromatic dianhydride, and aromatic diacid dichloride, wherein the aromatic diamine includes 2,2f-bis(trifluoromethyl)-benzidine, the aromatic dianhydride includes 9,9-bis(3,4-dicarboxyphenyl)fluorene dianhydride, the aromatic diacid dichloride includes terephthaloyl dichloride (TPC) and isophthaloyl dichloride (IPC), and the polyamideimide film has a modulus of 5 GPa or more and a retardation in a thickness direction ($R_{th}$) of 5000 nm or less as measured at 550 nm.

Here, though not limited thereto, the content of the terephthaloyl dichloride (TPC) may be 50 mol or more with respect to 100 mol of the aromatic diamine, the content of the isophthaloyl dichloride (IPC) may be 15 to 20 mol with respect to 100 mol of the aromatic diamine, and the content of the 9,9-bis(3,4-dicarboxyphenyl)fluorene dianhydride (BPAF) may be 15 to 20 mol with respect to 100 mol of the diamine.

The first to fourth embodiments are only embodiments for specifically illustrating the polyamideimide film of the present invention, and the present invention is not limited thereto.

In an exemplary embodiment of the present invention, a weight average molecular weight of the polyamideimide resin forming the film is not particularly limited, but may be 200,000 g/mol or more, 300,000 g/mol or more, or 200,000 to 500,000 g/mol. In addition, a glass transition temperature is not limited, but may be 300 to 400° C., and more specifically 330 to 380° C.

Hereinafter, a method of preparing the polyamideimide film of the present invention will be described in more detail.

In the present invention, the preparation method is not limited as long as a film satisfying both physical properties of a modulus of 5 GPa or more and a retardation in a thickness direction ($R_{th}$) of 5000 nm or less as measured at 550 nm is prepared, and the method described later is only specifically illustrated as an example and is not limited as long as the film satisfying the physical properties is prepared.

The film of the present invention may be prepared by applying a "resin solution" including a polyamideimide-based resin and a solvent on a substrate, and then performing drying or drying and stretching. That is, the film may be prepared by a solution casting method.

More specifically, the film may be prepared by reacting an aromatic diamine, an aromatic dianhydride, and an aromatic diacid dichloride to prepare a polyamic acid solution, imidizing the polyamic acid solution to prepare a polyamideimide resin, and dissolving the polyamideimide resin in an organic solvent to prepare a resin solution and then applying the resin solution to form a film.

Otherwise, the film may be prepared by reacting an aromatic diamine, an aromatic dianhydride, a cycloaliphatic dianhydride, and an aromatic diacid dichloride to prepare a polyamic acid solution, imidizing the polyamic acid solution to prepare a polyamideimide resin, and dissolving the polyamideimide resin in an organic solvent to prepare a resin solution and then applying the resin solution to form a film.

First, the case of preparing a polyamic acid solution is described.

The polyamic acid solution is a solution of monomers described above, and includes an organic solvent for a polymerization reaction in a solution. The kind of organic solvent is not largely limited, and as an example, may be anyone or two or more polar solvents selected from dimethylacetamide (DMAc), N-methyl-2-pyrrolidone (NMP), dimethylformamide (DMF), Dimethylsulfoxide (DMSO), ethylcellosolve, methylcellosolve, acetone, ethyl acetate, m-cresol, gamma-butyrolactone, and derivatives thereof.

In order to prepare the polyamic acid, the monomers described above may be polymerized at the same time, or the aromatic diamine and the aromatic diacid dichloride may be reacted to prepare an oligomer having an amine end and then the oligomer and additional aromatic diamine, aromatic dianhydride, and cycloaliphatic dianhydride may be reacted to prepare the polyamic acid solution. When the oligomer is prepared and then further polymerized, a block type polyamideimide is prepared and the mechanical properties of the film may be further improved.

A step of preparing an oligomer may include reacting the aromatic diamine and the aromatic diacid dichloride and purifying and drying the obtained oligomer. In this case, the aromatic diamine may be introduced at a mole ratio of 1.01 to 2 with respect to the aromatic diacid dichloride to prepare an amine terminated polyamide oligomer. The molecular weight of the oligomer is not particularly limited, but for example, the weight average molecular weight may be 1,000 to 3,000 g/mol. Next, a step of preparing the polyamic acid may be performed by a solution polymerization reaction in which the thus-prepared oligomer is reacted with a fluorine-based aromatic diamine, an aromatic dianhydride, and a cycloaliphatic dianhydride in an organic solvent.

Next, the thus-prepared polyamic acid is imidized to prepare a polyamideimide resin. It may be performed by chemical imidization, and the imidization may be performed by further including any one or two or more selected from an imidization catalyst and a dehydrating agent.

As the imidization catalyst, any one or two or more selected from pyridine, isoquinoline, β-quinoline, and the like may be used. In addition, as the dehydrating agent, any one or two or more selected from an acetic anhydride, a phthalic anhydride, a maleic anhydride, and the like may be used, but the present invention is not necessarily limited thereto.

In addition, an additive such as a flame retardant, an adhesion improver, inorganic particles, an antioxidant, a UV inhibitor, and a plasticizer may be mixed with the polyamic acid solution to prepare the polyamideimide resin.

In addition, after the imidization, the resin is purified using a solvent to obtain a solid content, which may be dissolved in a solvent to obtain a polyamideimide solution (resin solution). The solvent may include, for example, N,N-dimethyl acetamide (DMAc) and the like, but is not limited thereto.

The step of forming a film from the polyamideimide solution is carried out by applying the polyamideimide solution on a substrate, and then performing heat treatment to form a film.

As the substrate, for example, glass, stainless steel, a film, or the like may be used, but the present invention is not limited thereto. Application may be carried out by a die coater, an air knife, a reverse roll, a spray, a blade, casting, gravure, spin coating, and the like.

The heat treatment may be carried out step by step. For example, the heat treatment may be performed step by step at 80 to 200° C. for 1 minute to 2 hours or at 200 to 350° C. for 1 minute to 2 hours, may be performed step by step at 80 to 150° C. for 1 minute to 1 hour or 250 to 350° C. for 30 minutes to 2 hours, or may be performed step by step at 80 to 100° C. for 1 minute to 2 hours, at 100 to 200° C. for 1 minute to 2 hours, or at 250 to 300° C. for 1 minute to 2 hours. Here, the stepwise heat treatment may be performed by heating in a range of 1 to 20° C./min when moving to each step. In addition, the heat treatment may be performed in a separate vacuum oven, an oven filled with inert gas, a convection oven, or the like, but the present invention is not necessarily limited thereto. In addition, a film may be formed by application on a substrate using an applicator.

In the present invention, various forms of molded articles may be manufactured using the polyamideimide. As an example, the polyamideimide may be applied to a printed wiring board, a flexible circuit board, and the like including a film, a protective film, or an insulation film, but the present invention is not limited thereto. Specifically, the polyamideimide may be applied to a protective film which may replace cover glass, and has a wide application range in various industrial fields including a display.

More specifically, a window cover film such as a flexible display may be used.

The polyamideimide film according to an exemplary embodiment of the present invention may have a thickness of 1 to 500 μm, 10 to 250 μm, or 10 to 100 μm.

<Functional Coating Layer>

According to an exemplary embodiment of the present invention, the functional coating layer is a layer for imparting functionality of the polyamideimide film according to an exemplary embodiment of the present invention, and may be variously applied depending on the purpose.

Specifically, for example, the functional coating layer may include any one or more layers selected from an antistatic layer, an anti-fingerprint layer, an antifouling layer, an anti-scratch layer, an anti-reflective layer, and a shock absorption layer, but is not limited thereto.

The thickness of the functional coating layer is not limited, but may be 1 to 500 μm, more specifically 2 to 450 μm.

<Flexible Display Panel>

In an exemplary embodiment of the present invention, the polyamideimide film according to the exemplary embodiment, a window cover film including the same, a flexible display panel, or a flexible display device may be provided.

Here, the window cover film may be used as an outermost surface window substrate of the flexible display device. The flexible display device may be various image display devices such as a common liquid crystal display device, an electroluminescent display device, a plasma display device, and a field emission display device.

The display device including the window cover film of the present invention described above has excellent display quality to be displayed and significantly decreased distortion caused by light, thereby minimizing a user's eye strain with excellent visibility.

Hereinafter, examples will be provided for specifically describing the present invention, but the present invention is not limited to the examples below.

The physical properties of the present invention were measured as follows:

<Weight Average Molecular Weight>

Measurement was performed by dissolving a film in a DMAc eluent containing 0.05 M LiCl. GPC was performed using Waters GPC system, Waters 1515 isocratic HPLC Pump, and Waters 2414 Refractive Index detector, by connecting Olexis, Polypore and a mixed D column as a column, and using polymethylmethacrylate (PMMA STD) as a standard material, and analysis was performed at 35° C. at a flow rate of 1 mL/min.

<Modulus>

Measurement was performed using UTM 3365 available from Instron, under the condition of pulling a polyamide-imide film having a length of 50 mm and a width of 10 mm at 50 mm/min at 25° C.

The thickness of the film was measured and the value was input to the instrument. The unit of the modulus was GPa. The measurement was performed in accordance with ASTM D882.

<Light Transmittance>

Measurement was performed in accordance with ASTM D1003. A light transmittance meter (Nippon Denshoku, COH-5500) was used to measure a total light transmittance of films prepared in each example and comparative example in the entire wavelength area from 400 to 700 nm. The unit was %.

<Haze>

Measurement was performed using a spectrophotometer (from Nippon Denshoku, COH-5500) in accordance with the standard of ASTM D1003. The unit was %.

<Yellow Index (YI)>

Measurement was performed using a spectrophotometer (from Nippon Denshoku, COH-5500) in accordance with the standard of ASTM E313.

<Retardation in a Thickness Direction ($R_{th}$)>

The retardation in a thickness direction ($R_{th}$) was measured using AxoScan (OPMF, Axometrics Inc.). The retardation in a thickness direction ($R_{th}$) was measured in a wavelength range of 400 nm to 800 nm and the value at a wavelength of 550 nm was indicated as a reference.

Example 1

N,N-dimethylacetamide (DMAc) and 2,2'-bis(trifluoromethyl)-benzidine (TFMB) were added to a reactor under a nitrogen atmosphere, stirring was sufficiently performed, terephthaloyl dichloride (TPC) was added thereto, and stirring was performed for 6 hours to perform dissolution and the reaction. Thereafter, precipitation and filtration were performed using an excessive amount of water to obtain a reaction product, which was dried under vacuum at 90° C. for 6 hours or more and added to the reactor with DMAc under a nitrogen atmosphere to dissolve the reaction product, and 9,9-bis(3,4-dicarboxyphenyl)fluorene dianhydride (BPAF) was added thereto and stirring was performed for 12 hours to perform dissolution and reaction, thereby preparing a polyamic acid resin composition. Here, the amount of each monomer was such that a mole ratio of TFMB:BPAF:TPC was 100:20:80 as shown in the composition ratio of Table 1, a solid content was adjusted to 10 wt %, and a temperature of the reactor was maintained at 40° C.

Subsequently, each of pyridine and acetic anhydride was added sequentially at 2.5-fold moles relative to the total content of dianhydride, and stirring was performed at 60° C. for 12 hours.

The thus-prepared resin solution was solution-cast on a glass substrate using an applicator. Thereafter, the cast substrate was first dried at 90° C. for 30 minutes using a convection oven, further heat-treated at 280° C. for 1 hour under nitrogen airflow conditions, and then cooled to room temperature, and the film formed on the glass substrate was separated from the substrate to obtain a polyamideimide film having a thickness of 48 μm.

The physical properties of the thus-prepared polyamide-imide film were measured, and are shown in the following Table 2.

Examples 2 to 4

The films were prepared in the same manner as in Example 1, except that the mole ratios were changed as shown in the following Table 1.

The physical properties of the thus-prepared polyamide-imide film were measured, and are shown in the following Table 2.

Example 5

Terephthaloyl dichloride (TPC) and 2,2'-bis(trifluorom-ethyl)-benzidine (TFMB) were added to a mixed solution of dichloromethane and pyridine in a reactor, and stirring was performed at 25° C. for 2 hours under a nitrogen atmosphere to prepare an oligomer.

9.9-bis(3,4-dicarboxyphenyl)fluorene dianhydride (BPAF) and cyclobutanetetracarboxylic dianhydride (CBDA) were added to the reactor, and then dissolution and reaction were performed to prepare a polyamic acid resin composition. Here, the amount of each monomer was such that the mole ratio of TFMB:CBDA:BPAF:TPC was 100:10:15:75, as shown in the composition ratio in Table 1.

Other than that, the polyamideimide film was prepared in the same manner as in Example 1.

The physical properties of the thus-prepared polyamide-imide film were measured, and are shown in the following Table 2.

Examples 6 to 8

The film was prepared in the same manner as in Example 5, except that the mole ratio was changed as shown in the following Table 1.

The physical properties of the thus-prepared polyamide-imide film were measured, and are shown in the following Table 2.

Example 9

N,N-dimethylacetamide (DMAc) and 2,2'-bis(trifluorom-ethyl)-benzidine (TFMB) were added to a reactor under a nitrogen atmosphere and stirring was sufficiently performed, and 9,9-bis(3,4-dicarboxyphenyl)fluorene dianhydride (BPAF) and 4,4'-hexafluoroisopropylidene diphthalic anhy-dride (6FDA) were added thereto and stirring was performed sufficiently until the reactants were dissolved. Thereafter, terephthaloyl dichloride (TPC) was added thereto, stirring was performed for 6 hours to perform dissolution and reaction to prepare a polyamic acid resin composition. Here, the amount of each monomer was such that the mole ratio of TFMB:6FDA:BPAF:TPC was 100:10:10:80, as shown in the composition ratio in the following Table 1.

Subsequently, each of pyridine and acetic anhydride was added sequentially at 2.5-fold moles relative to the total content of dianhydride, and stirring was performed at 60° C. for 12 hours.

After the polymerization was completed, the polymeriza-tion solution was precipitated in an excessive amount of methanol and filtered to obtain a solid content, which was dried under vacuum at 50° C. for 6 hours or more to obtain polyamideimide powder. The powder was diluted and dis-solved at 10 wt % in N,N-dimethylacetamide (DMAc) to prepare a resin solution.

The thus-prepared resin solution was solution-cast on a glass substrate using an applicator. Thereafter, the cast substrate was first dried at 90° C. for 30 minutes using a convection oven, further heat-treated at 280° C. for 1 hour under nitrogen airflow conditions, and then cooled to room temperature, and the film formed on the glass substrate was separated from the substrate to prepare a polyamideimide film.

The physical properties of the thus-prepared polyamide-imide film were measured, and are shown in the following Table 2.

Examples 10 and 11

The film was prepared in the same manner as in Example 9, except that the mole ratio was changed as shown in the following Table 1.

The physical properties of the thus-prepared polyamide-imide film were measured, and are shown in the following Table 2.

Example 12

N,N-dimethylacetamide (DMAc) and 2,2'-bis(trifluorom-ethyl)-benzidine (TFMB) were added to a reactor under a nitrogen atmosphere and stirring was sufficiently performed, and then 9,9-bis(3,4-dicarboxyphenyl)fluorene dianhydride (BPAF) was added and stirring was performed sufficiently until the reactants were dissolved. Thereafter, isophthaloyl dichloride (IPC) and terephthaloyl dichloride (TPC) were added thereto, stirring was performed for 6 hours to perform dissolution and reaction, thereby preparing a polyamic acid resin composition. Here, the amount of each monomer was such that the mole ratio of TFMB:BPAF:IPC:TPC was 100:15:15:70, as shown in the composition ratio of the following Table 1.

Subsequently, each of pyridine and acetic anhydride was added sequentially at 2.5-fold moles relative to the total content of dianhydride, and stirring was performed at 60° C. for 12 hours.

After the polymerization was completed, the polymeriza-tion solution was precipitated in an excessive amount of methanol and filtered to obtain a solid content, which was dried under vacuum at 50° C. for 6 hours or more to obtain polyamide-imide powder. The powder was diluted and dis-solved at 10 wt % in N,N-dimethylacetamide (DMAc) to prepare a resin solution.

The thus-prepared resin solution was solution-cast on a glass substrate using an applicator. Thereafter, the cast substrate was first dried at 90° C. for 30 minutes using a convection oven, further heat-treated at 280° C. for 1 hour under nitrogen airflow conditions, and then cooled to room temperature, and the film formed on the glass substrate was separated from the substrate to prepare a polyamideimide film.

The physical properties of the thus-prepared polyamide-imide film were measured, and are shown in the following Table 2.

Example 13

The film was prepared in the same manner as in Example 12, except that the mole ratio was changed as shown in the following Table 1.

The physical properties of the thus-prepared polyamide-imide film were measured, and are shown in the following Table 2.

Comparative Examples 1 to 3

The films were prepared in the same manner as in Example 1, except that the mole ratios were changed as shown in the following Table 1.

The physical properties of the thus-prepared polyamide-imide film were measured, and are shown in the following Table 2.

Hereinabove, although the present invention has been described by specific exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

Since the polyamideimide film according to the present disclosure has both excellent mechanical properties and low retardation in a thickness direction, the film may have an improved screen distortion phenomenon, and also, is flexible

TABLE 1

| | Composition | | | | | | |
| Classification | TFMB | CBDA | BPDA | 6FDA | BPAF | IPC | TPC |
|---|---|---|---|---|---|---|---|
| Example 1 | 100 | | | | 20 | | 80 |
| Example 2 | 100 | | | | 30 | | 70 |
| Example 3 | 100 | | | | 40 | | 60 |
| Example 4 | 100 | | | | 50 | | 50 |
| Example 5 | 100 | 10 | | | 15 | | 75 |
| Example 6 | 100 | 15 | | | 15 | | 70 |
| Example 7 | 100 | 15 | | | 10 | | 75 |
| Example 8 | 100 | 25 | | | 25 | | 50 |
| Example 9 | 100 | | | 10 | 10 | | 80 |
| Example 10 | 100 | | | 25 | 5 | | 70 |
| Example 11 | 100 | | | 15 | 15 | | 70 |
| Example 12 | 100 | | | | 15 | 15 | 70 |
| Example 13 | 100 | | | | 20 | 20 | 60 |
| Comparative Example 1 | 100 | 15 | | 15 | | | 70 |
| Comparative Example 2 | 100 | | 20 | 10 | | | 70 |
| Comparative Example 3 | 100 | | 15 | 15 | | | 70 |

TABLE 2

| | | | | | | Mechanical properties |
|---|---|---|---|---|---|---|
| | | Optical properties | | | | |
| Classification | Thickness (um) | YI | Haze (%) | Tt (%) | Retardation (nm) | Modulus (GPa) |
|---|---|---|---|---|---|---|
| Example 1 | 48 | 2.6 | 0.4 | 89.3 | 3,727 | 6.57 |
| Example 2 | 48 | 2.0 | 0.4 | 89.8 | 3,100 | 6.02 |
| Example 3 | 48 | 2.4 | 0.4 | 89.5 | 3,000 | 5.68 |
| Example 4 | 48 | 2.3 | 0.3 | 89.3 | 2,423 | 5.27 |
| Example 5 | 48 | 2.7 | 0.4 | 89.3 | 3,634 | 6.57 |
| Example 6 | 48 | 2.4 | 0.5 | 89.6 | 4,490 | 7.10 |
| Example 7 | 47 | 3.0 | 0.5 | 89.3 | 4,241 | 7.41 |
| Example 8 | 49 | 2.2 | 0.4 | 90.0 | 3,800 | 6.88 |
| Example 9 | 48 | 2.6 | 0.3 | 89.4 | 4,422 | 6.21 |
| Example 10 | 45 | 2.3 | 0.3 | 89.8 | 4,111 | 5.79 |
| Example 11 | 49 | 2.3 | 0.3 | 89.9 | 3,487 | 5.86 |
| Example 12 | 58 | 2.5 | 0.4 | 89.8 | 4,242 | 5.93 |
| Example 13 | 56 | 2.5 | 0.2 | 89.5 | 3,700 | 5.29 |
| Comparative Example 1 | 53 | 2.5 | 0.3 | 89.7 | 5,300 | 6.62 |
| Comparative Example 2 | 50 | 2.8 | 0.3 | 89.2 | 5,200 | 6.51 |
| Comparative Example 3 | 51 | 2.9 | 0.4 | 89.1 | 5,500 | 6.62 | and has excellent bending properties, so that it may be applied to a window cover film of a flexible display.

What is claimed is:

1. A polyamideimide film comprising a unit derived from an aromatic diamine, an aromatic dianhydride, and an aromatic diacid dichloride, wherein the aromatic diamine comprises 2,2'-bis(trifluoromethyl)-benzidine (TFMB), the aromatic dianhydride comprises 9,9-bis(3,4-dicarboxyphenyl) fluorene dianhydride (BPAF), and the aromatic diacid dichloride comprises terephthaloyl dichloride (TPC), wherein a content of the terephthaloyl dichloride (TPC) is 50 mol or more with respect to 100 mol of the aromatic diamine, a content of the terephthaloyl dichloride (TPC) and the 9,9-bis(3,4-dicarboxyphenyl/fluorene dianhydride (BPAF) is 70 mol or more with respect to 100 mol of the diamine, and the polyamideimide film has a modulus of 5 GPa or more and a retardation in a thickness direction (Rth) of 5000 nm or less as measured at 550 nm.

2. The polyamideimide film of claim 1, wherein the polyamideimide film has a total light transmittance of 87% or more as measured at 400 to 700 nm in accordance with ASTM 1003, a haze in accordance with ASTM D1003 of 2.0% or less, and a yellow index in accordance with ASTM E313 of 5 or less.

3. The polyamideimide film of claim 1, wherein the polyamideimide film further comprises a unit derived from a cycloaliphatic dianhydride.

4. The polyamideimide film of claim 1, wherein the aromatic dianhydride further comprises 4,4'-hexafluoroisopropylidene diphthalic anhydride (6FDA).

5. The polyamideimide film of claim 4, wherein the aromatic dianhydride is used as a mixture of 9,9-bis (3,4-dicarboxyphenyl) fluorene dianhydride (BPAF) and 4,4'-hexafluoroisopropylidene diphthalic anhydride (6FDA) at a mole ratio of 1:1 to 1:5.

6. The polyamideimide film of claim 1, wherein the polyamideimide film has a thickness of 1 to 500 μm.

7. A window cover film comprising the polyamideimide film of claim 1.

8. The window cover film of claim 7, wherein the window cover film has any one or more coating layers selected from a hard coating layer, an antistatic layer, an anti-fingerprint layer, an antifouling layer, an anti-scratch layer, a low-refractive layer, an anti-reflective layer, and a shock absorption layer on at least one surface of the polyamideimide film.

9. A flexible display panel comprising the polyamideimide film of claim 1.

\* \* \* \* \*